Oct. 28, 1930.  E. HAZELL  1,779,813
FORM FOR MANUFACTURING RUBBER ARTICLES
Filed March 13, 1928

INVENTOR
Eardley Hazell
BY
Walter L. Pipes
ATTORNEY

Patented Oct. 28, 1930

1,779,813

UNITED STATES PATENT OFFICE

EARDLEY HAZELL, OF NEW YORK, N. Y., ASSIGNOR TO MORGAN & WRIGHT, OF DETROIT, MICHIGAN, A CORPORATION OF MICHIGAN

FORM FOR MANUFACTURING RUBBER ARTICLES

Application filed March 13, 1928. Serial No. 261,270.

This invention relates to forms for the manufacture of articles from dispersion by the direct deposition of the solid matter in the dispersion thereon in the shape desired. More particularly it relates to forms for the manufacture of rubber articles by the direct deposition of the rubber from the latex.

It aims to provide a new and useful form, having the requisite strength, which is relatively inexpensive to manufacture, and which permits the rubber or other material to be deposited rapidly thereon.

Embodiments of the invention are illustrated in the accompanying drawings in which.

Figure 1:
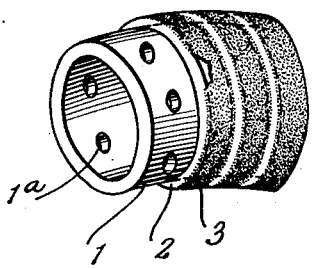
Fig. 1 is a perspective of the length of the form such as would be suitable for the manufacture of inner tubes, parts being broken away to better illustrate the construction.

Referring to Fig. 1 of the drawings, the form is shown as comprising a shape-retaining support 1 provided with a plurality of apertures 1ª, whose size, shape and spacing may be varied as desired. About the support 1 is coiled a wire 2, the windings thereof being preferably spaced apart more or less as shown. Between the convolutions 2, and preferably to a depth approximating the diameter of the wire, is applied a filtering composition 3 of a permanent character. The surface may be buffed or otherwise rendered as smooth as the nature of the article to be manufactured requires.

Figure 2:
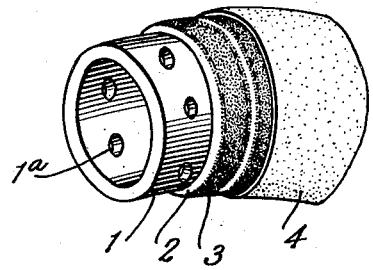
Fig. 2 is a similar view of a modification.

Fig. 2 of the drawings is the same construction as illustrated in Fig. 1 with, however, an additional surfacing coat of another filtering composition 4 which may be readily and economically renewed.

Figure 3:
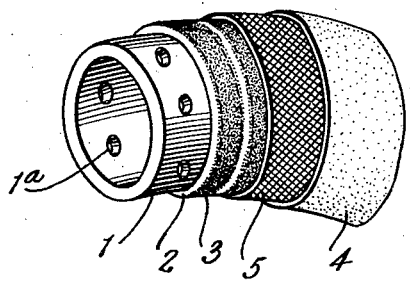
Fig. 3 is a similar view of a further modification.

Fig. 3 shows substantially the same construction as is disclosed in Fig. 2 with the exception, however, that a fabric or fibrous layer 5 is interposed between the filtering compositions 3 and 4 in order to facilitate the rate of filtration and consequent deposition of the rubber or other dispersed material upon the form.

The shape retaining support is preferably metallic, but may be made of any other material having sufficient rigidity and strength and not affected by water. Aluminum is very suitable for the support, for it is sufficiently strong and at the same time is light in weight. The support may be apertured to permit the passage of fluid from one surface to the other, and it may be grooved, channeled, or knurled to facilitate the lateral travel of fluid to the ends of the form, or, if the channelling etc. be used in conjunction with the apertures, the channels or grooves assist the liquid to flow laterally to the apertures through which it may pass, preferably with the aid of vacuum or a differential of pressure. The wire may be of the ordinary kind, or it may be flattened or knurled. The purpose of the wire is two-fold. It acts as a channelling means to facilitate lateral flow of fluid and it also furnishes a suitable anchoring means for the permanent filtering composition.

The permanent filtering composition 3 preferably comprises a porous or pore-producing material and a suitable binder. The diatomaceous earths, kieselguhr, clays, paper pulp are illustrations of pore producing or porous materials. Excellent binders are the liquid condensation products of phenols and aldehydes, for these may be hardened at a comparatively low temperature (130° C. or thereabouts.) Other binders are gelatinized paper pulp and organic material which when heated or otherwise treated becomes hardened, resinified, or otherwise made more or less permanent. It is also possible to employ as the permanent filtering composition a porous material which can be hardened by firing, providing the temperature required is not so high that the other elements of the form will be damaged. Any of the filtering materials may be prepared in paste or fluid form and applied to the wire wound support. After hardening, the surface of the composition may be buffed, sand papered, or otherwise rendered relatively smooth.

If a supplemental surfacing coat 4 be applied, as illustrated in Fig. 2, this surfacing is preferably of the nature of a clay slip containing a diatomaceous earth, relatively inexpensive and renewable. This may be deposited over the permanent filtering layer by immersion or by filtering it directly thereonto, with or without vacuum or a differential of pressure. In this surface coating no binder need be employed.

While in the foregoing certain modifications of the invention have been described and illustrated, it will be apparent that the same principles may be applied for the preparation of inner tube forms of the external or mold type. The forms may of course be of any desired shape and size for the production of any desired rubber articles. It is also apparent that other features may be added to the forms without departing from the spirit of the invention. For example the support may be capable of acting as an electrode or may be treated so that a current may be carried through it or around it. By so doing the rubber may be electro deposited upon the form. The support may be suitably fitted to permit a vacuum to be applied or so that a differential of pressure may be set up between the interior and the exterior of the form the greatest pressure being applied to the latex bath. In the case of inner tube mandrels or of tubular articles in which the ends are required to be joined, the ends of the form may be suitably shaped to produce tapered or skived ends simultaneously with the deposition of the rubber.

It is understood that all such changes and modifications which come within the principles underlying the invention are intended to be comprehended in the accompanying claims, to which reference is made for an understanding of the scope of the invention.

Having thus described my invention, what I claim and desire to protect by Letters Patent is:

1. A form for the manufacture of rubber articles from rubber dispersions which comprises a support, separated convolutions of wire, and a filtering layer between and at least flush with the wires.

2. A form for the manufacture of rubber articles from rubber dispersions which comprises an apertured support, spaced-apart convolutions of wire over the support, and a filtering layer overlaying the support and completely filling the intervals between the convolutions of wire.

3. A form for the manufacture of inner tubes from rubber dispersions which comprises an apertured support, spaced convolutions of wire wrapped helically thereabout, a permanent filtering composition between and held in place by the wires.

4. A form for the manufacture of inner tubes from rubber dispersions which comprises an apertured metallic support, spaced convolutions of wire around the support, a permanent filtering composition anchored to the support and filling the spaces between the wires, and a renewable surfacing layer of a second filtering composition forming the external surface of the form.

5. A form for the manufacture of inner tubes from rubber dispersions which comprises an apertured aluminum support, spaced convolutions of wire tightly wrapped around the support, a permanent filtering composition anchored to the support by the wires, said composition filling the intervals between the wires, and a surfacing layer of a clay slip over the permanent filtering composition.

Signed at New York, county and State of New York, this 10th day of March, 1928.

EARDLEY HAZELL.